United States Patent [19]
Schulz

[11] Patent Number: 4,659,608
[45] Date of Patent: Apr. 21, 1987

[54] EMBOSSED FIBROUS WEB PRODUCTS AND METHOD OF PRODUCING SAME

[75] Inventor: Galyn A. Schulz, Appleton, Wis.

[73] Assignee: James River-Norwalk, Inc., Norwalk, Conn.

[21] Appl. No.: 494,685

[22] Filed: May 17, 1983

Related U.S. Application Data

[63] Continuation-in-part of Ser. No. 116,230, Jan. 28, 1980, abandoned, which is a continuation of Ser. No. 001,741, Jan. 8, 1979, abandoned.

[51] Int. Cl.⁴ .......................... D04H 1/64; B32B 3/30; B32B 31/20

[52] U.S. Cl. .................................... 428/171; 428/906; 428/172; 428/187; 428/537.5

[58] Field of Search ............... 428/171, 906, 172, 187, 428/537

[56] References Cited

U.S. PATENT DOCUMENTS 4,127,637 11/1978 Pietreniak et al. .............. 428/171 X
4,135,024 1/1979 Callahan et al. .................... 428/171

*Primary Examiner*—Nancy Swisher
*Attorney, Agent, or Firm*—William A. Aguele; Harry W. Hargis, III; Thomas H. Whaley

[57] ABSTRACT

A method of embossing a sheet of non-woven fibrous web, and the resulting fibrous sheet structure, e.g. toilet tissue, with a series of identical boss elements arranged in a uniform pattern in a manner to avoid nesting of the embossments and resulting non-uniform product rolls when the sheet is rolled onto a mandrel. The embossments are uniformly spaced in rows which in the longitudinal direction form an angle in the range of 15° to 23° relative to the edge of the sheet or roll and an angle in the range of 40° to 57° relative to the cross direction of the sheet or roll.

4 Claims, 4 Drawing Figures

EMBOSSED FIBROUS WEB PRODUCTS AND METHOD OF PRODUCING SAME

This application is a continuation-in-part of my co-pending application, Ser. No. 116,230, filed Jan. 28, 1980, now abandoned, which in turn was a continuation of my prior application Ser. No. 001,741, filed Jan. 8, 1979, now abandoned.

This invention relates to a method of embossing a non-woven fibrous web, and to the resulting embossed fibrous sheet, such as, for example, toilet tissue and paper towels, the fibrous sheet product is normally packaged and sold in rolls. Embossing the non-fibrous web by the method of this invention results in improvements in absorbency, softness and appearance of the product sheets and in a uniform and attractive roll package.

It is already known in the art to emboss sheets comprising multiple plies of creped tissue to increase the surface area of the sheets thereby enhancing their bulk and water holding capacity. Paper towels and toilet tissue are usually marketed in rolls, contain a specified number of sheets per roll. Paper towels or tissue embossed in conventional patterns of spot embossments, when packaged in roll form, exhibit a tendency to be non-uniform in appearance due to frequent nesting of the bosses as the sheet is wound onto the roll, resulting in non-uniformity of size and appearance of the rolls. Embossment patterns typical of conventional practice have a tendency to frequent nesting of the bosses when rolled on a hollow core or mandrel. The so-called line patterns, e.g. the pattern illustrated in U.S. Pat. No. Des. 242,579 are especially prone to nesting of the bosses in the product roll. Since the appearance of a roll of toilet tissue or paper towels is an important attribute suggestive of quality of the product, as well as its softness and absorbency, it is most desirable to avoid nesting of bosses and resulting non-uniformity of rolls of product, especially those products sold to individual consumers in supermarkets.

It has been proposed heretofore to emboss paper products to avoid nesting of the bosses in rolled, folded, or stacked sheets of paper products by various means including embossing the sheet with bosses of varying configurations, e.g. as in U.S. Pat. No. Des. 230,311 or alternating sheets or strips embossed with one pattern with sheets or strips embossed with another pattern, or alternating embossing patterns on a single strip, e.g. U.S. Pat. Nos. 1,863,973; 2,177,490; and 2,284,663.

By the method of this invention it is possible to produce paper toweling and toilet tissue and rolls of product produced therefrom by embossing a pattern of uniformly spaced identical bosses in angular rows on a continuous sheet or strip of non-woven fibrous webs of the towel and tissue type. Embossing in this manner enhances the absorbency and softness of the sheet and results in a spiral wound roll package of improved uniformity and appearance.

Such fibrous sheet products, generally termed non-woven fibrous webs, when produced on a paper making machine are non-uniform in tensile strength, having a greater tensile strength in the machine direction than in the cross-machine direction. When rolled, a strip of the sheet material is wound onto a mandrel or hollow core in the machine direction with perforations in the cross-machine direction to facilitate tearing off sheets from the strip. Conventionally, rolls of paper toweling and toilet tissue are perforated to produce an approximately square sheet when separated into individual sheets at the perforations.

When the sheets or webs are embossed, the embossment most frequently comprises repetitive parallel rows of identical or alternating boss patterns arranged in the cross-machine direction perpendicular to the machine direction. The boss patterns are also in alignment with one another in the machine direction, with identical bosses appearing either in adjacent cross-machine rows or in alternate rows once or twice removed. Alignment of bosses in the machine direction frequently causes "ridging" of the roll product detracting from its appearance. While alternating the patterns of individual bosses reduces nesting of the bosses in the finished roll products, the expense of the machine embossing roll necessary to produce such patterns of embossment is considerably increased. This invention provides a solution to the above-mentioned problems by providing a method of embossing with identical bosses while avoiding both ridging and nesting of bosses in the rolled product.

In the method of this invention, the embossment produces a first and second series of parallel rows of bosses, neither of which is parallel to or normal to the machine direction of the web. Each row comprises a pattern of bosses equally spaced within the rows with the rows of each series uniformly spaced from one another. When viewed in the machine direction, the first series of rows of bosses crosses the web at an angle of about 40° to about 57° relative to the machine direction and the second series of rows is disposed at an angle of from about 15° to about 23° from the machine direction. When the embossed web is rolled on a mandrel or hollow core, the bosses in the first and second series of rows sufficiently offset from one another that when bosses in one row of one series fall on top of another row of the same series, the shift in position of the bosses due to the angle of the other row relative to the first is sufficient to prevent one boss or row of bosses from making an exact register with the other. The result is a compact uniform roll of product toweling or tissue of excellent appearance and softness.

The invention will be more readily understood by reference to the accompanying drawings wherein FIG. 1 is a plan view of a sheet of fibrous material illustrating a preferred pattern of bosses arranged in rows in accordance with this invention;

Figure 1:
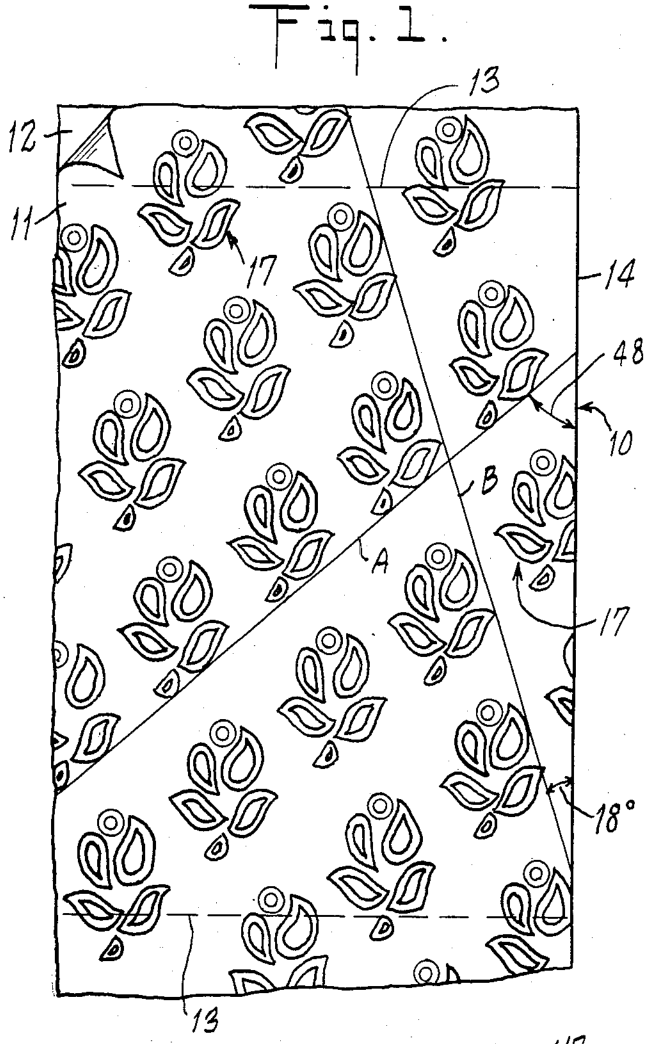

With reference to FIG. 1 of the drawings, an embossed sheet structure 10 comprises a pair of webs or plies 11 and 12 of creped fiber stock such as is used in paper tissue or toweling. As illustrated in this figure, an embossment pattern produced in accordance with the method of this invention is embodied in sheets of bathroom tissue typically of 4.5 inch squares joined along adjacent perforated edges, as seen at 13, to form a strip that is rolled upon a core of about 1.5 inch diameter and about 4.5 inches long, to form a finished roll about five inches in diameter. With reference to FIG. 1, the machine direction extends substantially parallel to the free edge 14 of sheet 10 and the cross machine direction extends at a right angle or normal to the machine direction and parallel to the perforations 13.

Typical two-ply bathroom tissue is formed by first joining two webs of creped tissue, and when embossed, both webs are then embossed simultaneously. The caliper of the resultant product can be tested on a TMI Special Model 551-M motorized micrometer available from Testing Machines Incorporated, Amityville, N.Y. Eight two-ply sheets are interposed as a stack between parallel, two-inch diameter anvils and subjected to 539±30 grams dead weight load. Using this test method, bathroom tissue embossed by the method of this invention had a caliper of from about 0.066 inch to about 0.072 inch.

With further reference to FIG. 1, a pattern of identical bosses 17 are illustrated. In this example of a product produced by one preferred specific embodiment of the method of this invention, the bosses 17 are disposed to define a first and a second series of intersecting parallel rows, designated by the lines A and B in FIG. 1, the first series crossing the second series at an acute angle relative to the machine direction. Identical boss elements 17 are mutually equally spaced in the rows, and the rows of each series are uniformly mutually spaced from one another. The first series of rows extends at an angle of from about 40° to about 57°, preferably at an angle of about 48°, to the machine direction, and the second series of rows extends at an angle of from about 15° to 23°, preferably at an angle of about 18°, to the machine direction. Considered another way, the angle between the second series of rows B and the machine direction, or the direction of wrap onto a roll, is in the range of 15° to 23°. The ratio of the transverse dimension across each emboss element and the spacing between said rows is between about 1.2 and about 6.5.

Figure 2:
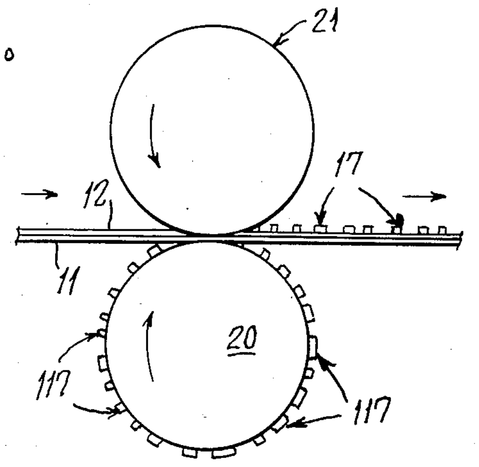
FIG. 2 is a diagrammatic elevational view of apparatus for embossing fibrous web sheets.
Figure 3:
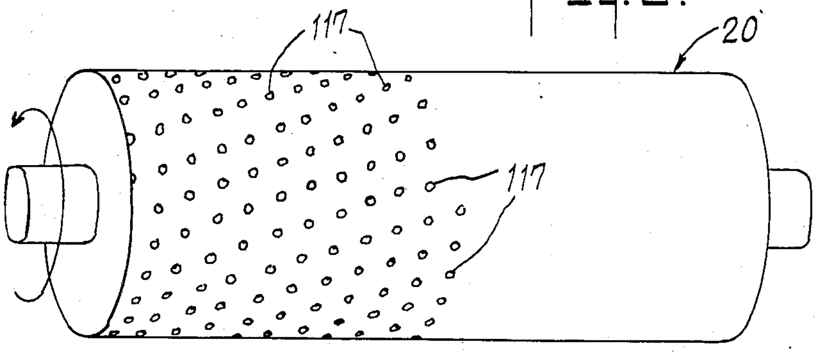
FIG. 3 is a diagrammatic perspective view of an embossing row illustrating at its one end arrangement of bosses for embossing the sheet illustrated in FIG. 1.
Figure 4:
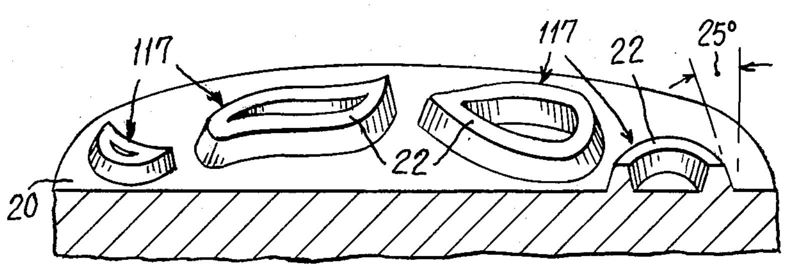
FIG. 4 is an enlarged fragmented perspective view of the surface of an embossing roll with spiral rows of projections suitable for embossment of fibrous webs in the pattern illustrated in FIG. 1.

In this specific example, the depth of each boss 17 is about 0.060 inch, each boss comprising an array of closed curvilinear patterns about 0.020 inch wide. With reference to FIGS. 2 to 4, it will be seen that the pattern of bosses is produced by passing adherent plies 11 and 12 between a steel engraved embossing roll 20 and a rubber backup roll 21. A spiral spot pattern 117 on steel roll 20 corresponds to the pattern 17, and is made up of correspondingly disposed closed curvilinear lands 22 about 0.020 inch wide, about 0.060 inch in depth, and the sides of which have a slope of about 25° to the radius of the roll.

It will be appreciated that it is the combination of the hereinabove described disposition of the boss elements, taken with the thickness of the tissue and the depth of the bosses, that provides softness to a roll when the elongated sheet structure 10 has been spiral wound onto a mandrel or core. Typically, the core diameter is about 1.5 inch diameter to form a roll of about 400 individual sheets, and having a diameter of about 4.9 inches.

The disclosed angular disposition of the bosses, taken with the dimensions of the bosses 17 and the spacing between rows, minimizes the possibility of bosses 17 nesting within one another or on the lands between the bosses to provide uniform rolls free from ridges.

While a preferred embodiment of the method of embossing non-woven fibrous webs in accordance with this invention has been described in detail, it will be understood that the resulting product is also novel and included in the scope of this invention.

I claim:

1. A strip of absorbent fibrous web tissue having a cross-machine direction and a machine direction and adapted for spiral wrapping into a roll in its machine direction, said strip comprising a first and a second series of uniformly spaced parallel rows of identically oriented emboss elements of identical size and shape impressed into said tissue from one side only, said first series crossing said second series, each said row comprising a pattern of identical boss elements equally spaced from one another within the rows, said first series of rows being disposed at an angle of from about 40° to about 57° to the machine direction and the second series of rows being disposed at an angle of from about 15° to about 23° to the machine direction wherein the ratio of the transverse dimension across each boss and the spacing between said rows is between about 1.2 and about 6.5.

2. A sheet of tissue as defined in claim 1, characterized in that said first recited angle is about 48° and said second recited angle is about 18°.

3. A sheet of tissue as defined in claim 1, and further characterized in that said sheet product is of from about 0.066 to 0.072 inch caliper, and each said element is about 0.060 inch deep and about 0.020 inch wide.

4. An improved roll package of absorbent fibrous web sheet product having a cross-machine direction and a machine direction spirally wound in said machine direction and comprising a first and second series of uniformly spaced parallel rows of identically oriented boss elements of identical size and shape equally spaced from one another and impressed in said web from one side only forming said bosses on the opposite side of said sheet, said first series of parallel rows being disposed at an angle from about 40° to about 57° to the machine direction, and the second series of parallel rows being disposed at an angle of from about 15° to about 23° to the machine direction wherein the ratio of the transverse dimension across each boss and the spacing between rows is between about 1.2 and about 6.5.

* * * * *